(12) United States Patent
Kang et al.

(10) Patent No.: US 12,021,216 B2
(45) Date of Patent: Jun. 25, 2024

(54) METHOD AND APPARATUS FOR PREPARING DRY ELECTRODE SHEET FOR SECONDARY BATTERY, DRY ELECTRODE SHEET FOR SECONDARY BATTERY AND SECONDARY BATTERY COMPRISING THE SAME

(71) Applicant: SK ON CO., LTD., Seoul (KR)

(72) Inventors: Yong Hee Kang, Daejeon (KR); Young Jun Kim, Daejeon (KR); Dong Hoon Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/316,234

(22) Filed: May 12, 2023

(65) Prior Publication Data

US 2023/0369559 A1    Nov. 16, 2023

(30) Foreign Application Priority Data

May 12, 2022    (KR) .................. 10-2022-0058423

(51) Int. Cl.
*H01M 4/04* (2006.01)
*H01M 4/62* (2006.01)
*H01M 10/04* (2006.01)
*H01M 4/02* (2006.01)

(52) U.S. Cl.
CPC ......... *H01M 4/0435* (2013.01); *H01M 4/622* (2013.01); *H01M 10/0409* (2013.01); *H01M 10/0431* (2013.01); *H01M 2004/021* (2013.01)

(58) Field of Classification Search
CPC .............. H01M 4/0435; H01M 4/622; H01M 10/0409; H01M 10/0431
See application file for complete search history.

(56) References Cited

U.S. PATENT DOCUMENTS

| | | | |
|---|---|---|---|
| 7,572,551 B1 | 8/2009 | Panzer et al. | |
| 2015/0076419 A1* | 3/2015 | Takahashi | C08K 7/06 252/511 |
| 2017/0256367 A1 | 9/2017 | Raman et al. | |
| 2018/0083260 A1 | 3/2018 | Jiang et al. | |
| 2019/0267599 A1* | 8/2019 | Xiao | B32B 3/26 |
| 2020/0227723 A1 | 7/2020 | Wang et al. | |
| 2021/0098770 A1 | 4/2021 | Yudi et al. | |
| 2021/0155766 A1 | 5/2021 | Zhang et al. | |
| 2021/0288302 A1* | 9/2021 | Jamadar | H01M 4/0435 |

FOREIGN PATENT DOCUMENTS

| | | |
|---|---|---|
| EP | 3799157 A1 | 3/2021 |
| KR | 10-2018-0119158 A | 11/2018 |
| KR | 10-2020-0136039 A | 12/2020 |
| KR | 10-2021-0006899 A | 1/2021 |

OTHER PUBLICATIONS

Extended European Search Report for the European Patent Application No. 23173149.8 issued by the European Patent Office dated Oct. 17, 2023.

* cited by examiner

*Primary Examiner* — Kenneth J Douyette
(74) *Attorney, Agent, or Firm* — IP & T GROUP LLP (57) ABSTRACT

A method of manufacturing a dry electrode sheet for a secondary battery includes providing a dry electrode composition comprising an active electrode material and a binder, calendering the dry electrode composition with a calender roll and forming a first electrode sheet, cutting the first electrode sheet into two or more pieces, and laminating and then calendering the cut first electrode sheet.

6 Claims, 5 Drawing Sheets

METHOD AND APPARATUS FOR PREPARING DRY ELECTRODE SHEET FOR SECONDARY BATTERY, DRY ELECTRODE SHEET FOR SECONDARY BATTERY AND SECONDARY BATTERY COMPRISING THE SAME

CROSS-REFERENCE TO RELATED APPLICATION(S)

This application claims the benefit under 35 USC 119(a) of Korean Patent Application No. 10-2022-0058423 filed on May 12, 2022 in the Korean Intellectual Property Office, the entire disclosure of which is incorporated herein by reference for all purposes.

BACKGROUND

1. Field

The present disclosure relates to a method and apparatus for manufacturing a dry electrode sheet for a secondary battery, a dry electrode sheet for a secondary battery, and a secondary battery including the same.

2. Description of Related Art

Lithium secondary batteries are used not only as an energy source for mobile devices, but also as a power source for electric vehicles (EVs) and hybrid electric vehicles (HEVs), and demand therefor is continuously increasing.

The manufacturing process of a lithium secondary battery is largely divided into three operations, including an electrode (electrode plate) process, an assembly process, and a conversion (activation) process. The electrode process is re-divided into a mixing (active material mixing) process of preparing an electrode mixture slurry by mixing the electrode composition including the active material with a solvent, a coating process of coating the electrode mixture slurry on a current collector to form a mixture layer, a drying operation of removing the solvent from the mixture layer, a rolling operation of pressurizing the mixture layer to form a predetermined thickness, a slitting process of manufacturing electrode tabs by cutting uncoated areas, and the like.

In general, in the drying process, the solvent contained in the electrode mixture slurry is evaporated. In the drying process of evaporating the solvent, surface defects may occur on the surface of the previously formed electrode.

In addition, a particle migration phenomenon due to a difference in solvent evaporation rate, i.e., in which particles such as a binder move from a site to be dried first together with the evaporating solvent and rise to the surface to form a gap with the site to be dried relatively later, and thus, electrode binding force (adhesive force) may decrease.

To prevent this problem, a technique for controlling the evaporation rate of the solvent while uniformly drying the inside and outside of the electrode mixture layer is being developed. However, drying apparatuses applied to these technologies are very expensive and require considerable cost and time for operation, which is disadvantageous in terms of manufacturing processability.

On the other hand, a dry electrode manufacturing method has recently been proposed to improve electrode quality deterioration and manufacturing processability problems. In the dry electrode manufacturing method, since the active electrode material, binder, etc. are not dissolved in the solvent, the drying process may be omitted. The dry electrode manufactured in this manner has a problem in that the electrode does not maintain the sheet shape, such as cracks in the electrode sheet manufactured due to insufficient tensile strength.

Therefore, in the manufacturing of electrodes, there is a high need for a technology capable of improving electrode quality and manufacturing process without migration of the binder.

SUMMARY

An aspect of the present disclosure is to provide a dry electrode sheet manufacturing method that does not require a drying process.

An aspect of the present disclosure is to provide an apparatus capable of manufacturing the dry electrode sheet.

An aspect of the present disclosure is to provide a dry electrode sheet manufactured using the dry electrode sheet manufacturing method and a battery including the same.

According to an aspect of the present disclosure, a method of manufacturing a dry electrode sheet for a secondary battery includes providing a dry electrode composition comprising an active electrode material and a binder; calendering the dry electrode composition with a calender roll and forming a first electrode sheet; cutting the first electrode sheet into two or more pieces; and laminating and then calendering the cut first electrode sheet.

The cutting may be performed in a longitudinal direction or a width direction of the first electrode sheet.

The cutting may be performed by halving the first electrode sheet in the longitudinal direction.

The calendering in the laminating and calendering operation is performed by the calender roll of the calandaring operation.

The calendered electrode sheet obtained by the laminating and calendering operation may be further subjected to a cutting operation and a laminating and calendering operation.

The cutting operation and the laminating and calendering operation may be repeated 20 times or less.

After the cutting operation, an operation of winding the cut first electrode sheet may be further included.

The calendering roll may have a temperature of 50 to 200° C.

The binder may be a fiberizable binder.

The binder may be at least one selected from the group consisting of polytetrafluoroethylene, polyethylene oxide, polyvinylpyrrolidone, polyvinyl alcohol, and cellulose derivatives.

The dry electrode composition may further include at least one selected from the group consisting of a conductive material, a particulate binder, and a thickener.

According to an aspect of the present disclosure, an apparatus for manufacturing a dry electrode sheet for a secondary battery includes a calender roll including two or more rolls spaced apart from each other and manufacturing an electrode sheet by calendering a dry electrode composition supplied between the two or more rolls; a cutting unit cutting the electrode sheet manufactured by the calender roll into two or more pieces; and a lamination unit laminating electrode sheets cut by the cutting unit and supplying laminated electrode sheets to the calender roll.

In the calender roll, at least three rolls of a first roll, a second roll, and a third roll are sequentially disposed, and the first roll and the second roll and the second roll and the third roll may be spaced apart from each other.

The two or more rolls may be spaced apart at intervals of 100 to 500 μm.

The apparatus may further include two or more first rewinding rolls each winding the electrode sheets cut by the cutting unit, and the cut electrode sheets wound around the first rewinding roll may be supplied to the lamination unit.

The cutting part may cut the electrode sheet in a longitudinal direction or a width direction.

The cutting part may divide the electrode sheet in half in a longitudinal direction.

A second rewinding roll winding the laminated electrode sheet in the lamination unit may be further included, and the laminated electrode sheet wound around the second rewinding roll may be supplied to the calender roll.

According to another aspect of the present disclosure, a dry electrode sheet for a secondary battery manufactured using the above method is provided.

The electrode sheet may have a tensile strength of 0.50 N/mm$^2$ or more.

The electrode sheet may have an electrode density of 2.0 g/cc or more.

The electrode sheet may have a thickness of 100 to 500 μm.

As another embodiment, an electrode for a secondary battery including a current collector and the dry electrode sheet for a secondary battery as described above on the current collector is provided.

The electrode sheet may have a tensile strength of 0.50 N/mm$^2$ or more.

The electrode sheet may have an electrode density of 2.0 g/cc or more.

The electrode may be a cathode or an anode.

According to an aspect of the present disclosure, a secondary battery is provided in which an electrode assembly including a positive electrode, a separator, and a negative electrode and an electrolyte solution are accommodated in a battery case and sealed, wherein at least one of the positive electrode and the negative electrode is the electrode described above.

BRIEF DESCRIPTION OF DRAWINGS

The above and other aspects, features, and advantages of the present disclosure will be more clearly understood from the following detailed description, taken in conjunction with the accompanying drawings, in which:

FIG. 3 is a diagram schematically illustrating the cutting method of the present disclosure, in which

DETAILED DESCRIPTION

Hereinafter, preferred embodiments will be described. However, the embodiments may be modified in many different forms, and the scope of the present disclosure is not limited to the embodiments described below.

One aspect of the present disclosure provides a dry electrode composition comprising an active material and a binder, a calendering operation of forming a first electrode sheet by calendering the dry electrode composition with a calender roll, the first electrode sheet It provides a dry electrode sheet manufacturing method of a secondary battery comprising a cutting operation of cutting into two or more pieces and a laminating and calendering operation of laminating and then calendering the cut first electrode sheet.

The dry electrode composition may include an active electrode material and a binder, and may include a small amount of a solvent if necessary. The binder may be evenly distributed among the active electrode materials by mixing the dry electrode composition including the powdery components not containing the solvent using a blender or the like.

The method of manufacturing a dry electrode sheet for a secondary battery according to the present disclosure may be applied to both manufacturing a cathode sheet and a cathode sheet. Accordingly, the active electrode material may be a positive active electrode material or a negative active electrode material.

For example, when an electrode to be manufactured is an anode, the anode active material may be a carbon-based anode active material. The carbon-based negative active electrode material may be suitably used in the present disclosure as long as it is commonly used in the manufacture of a negative electrode of a secondary battery, and is not particularly limited, but may be artificial graphite, natural graphite, or a mixture of artificial graphite and natural graphite. Artificial graphite may further improve the dispersibility of the slurry, and may improve the lifespan and high-temperature storage characteristics.

The shape of the artificial graphite or natural graphite may be amorphous, plate-like, flake-like, spherical, fibrous, or a combination thereof. In addition, when mixing and using the artificial graphite and natural graphite, the mixing ratio may be 70:30 to 95:5 by weight.

The anode active material may be used without particular limitation as long as it has a shape capable of intercalating and deintercalating lithium ions, and generally has an aspect ratio of 20 or more in terms of improving the function of the anode active material for a lithium secondary battery.

In addition, the negative active electrode material may further include at least one of a silicon (Si)-based negative active electrode material, a tin (Sn)-based negative active electrode material, or a lithium vanadium oxide negative active electrode material together with the carbon-based negative active electrode material. When the anode active material further includes these, it may be included in the range of 1 to 50% by weight based on the total weight of the anode active material.

The Si-based negative active electrode material may be Si, a Si—C composite, SiOx ($0<x<2$), or a Si-Q alloy. In the Si-Q alloy, Q may be an element selected from the group consisting of alkali metals, alkaline earth metals, Group 13 elements, Group 14 elements, Group 15 elements, Group 16 elements, transition metals, rare earth elements, and combinations thereof, other than Si, and in detail, may be selected from the group consisting of, Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and combinations thereof.

In general, as an anode active material, a Si-based anode active material is known to have a large volume change characteristic. In general, a silicon-based negative active electrode material may be added together with a carbon-based negative active electrode material such as graphite, and in this case, carbon nanotubes may be included as a conductive material to prevent swelling due to volume expansion of the silicon-based negative active electrode material.

The Sn-based negative active electrode material may be Sn, SnO2, or Sn—R alloy. In the Sn—R alloy, R may be an element selected from the group consisting of alkali metals, alkaline earth metals, group 13 elements, group 14 elements, group 15 elements, group 16 elements, transition metals, rare earth elements, and combinations thereof, other than Sn and Si, and in detail, may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, In, Tl, Ge, P, As, Sb, Bi, S, Se, Te, Po, and combinations thereof.

The content of the negative active electrode material in the negative electrode mixture layer may be 94 to 98% by weight based on the total weight of the dry negative electrode composition.

Meanwhile, when an electrode to be manufactured is a positive electrode, a compound capable of reversibly intercalating and deintercalating lithium (lithiated intercalation compound) may be used as the positive active electrode material. In detail, at least one of a composite oxide of lithium and a metal selected from cobalt, manganese, nickel, and combinations thereof may be used.

More specific examples include a lithium transition metal compound (oxide) having a layered structure represented by the general formula $LiMO_2$, where M includes at least one of transition metal elements such as Ni, Co, and Mn, and may further include other metal elements or non-metal elements. As the complex oxide, there may be, for example, a monolithic lithium transition metal composite oxide containing one type of the transition metal element, a so-called binary lithium transition metal composite oxide containing two types of transition metal elements, and a ternary lithium transition metal composite oxide containing Ni, Co and Mn as transition metal elements as constituent elements. In detail, examples of the composite oxide may include $Li_xMn_{1-y}M_yA_2$, $Li_xMn_{1-y}M_yO_{2-z}X_z$, $Li_xMn_2O_{4-z}X_z$, $Li_xMn_{2-y}M_yM'_zA_4$, $Li_xCo_{1-y}M_yA_2$, $Li_xCo_{1-y}M_yO_{2-z}X_z$, $Li_xNi_{1-y}M_yA_2$, $Li_xNi_{1-y}M_yO_{2-z}X_z$, $Li_xNi_{1-y}Co_yO_{2-z}X_z$, $Li_xNi_{1-y-z}Co_yMn_zA\alpha$, $Li_xNi_{1-y-z}Co_yMn_zO_{2-\alpha}X_\alpha$, or $Li_xNi_{1-y-z}Mn_yMn_zA\alpha$, $Li_xNi_{1-y-z}Mn_yMn_zO_{2-\alpha}X$ (In these formulas, $0.9 \leq x \leq 1.1$, $0 \leq y \leq 0.5$, $0 \leq z \leq 0.5$, and $0 \leq \alpha \leq 2$, M and M' are the same or different and are selected from the group consisting of Mg, Al, Co, K, Na, Ca, Si, Ti, Sn, V, Ge, Ga, B, As, Zr, Mn, Cr, Fe, Sr, V and rare earth elements, A is selected from the group consisting of O, F, S and P, and X is selected from the group consisting of F, S and P), and for example, may be a ternary lithium transition metal composite oxide such as $Li(Ni_{1/3}Co_{1/3}Mn_{1/3})O_2$.

In addition, examples of a lithium transition metal compound (oxide) represented by the general formula Li2MO3 may include, for example, Li2MnO3, Li2PtO3, or the like, where M includes at least one of transition metal elements such as Mn, Fe, and Co, and may further include other metal elements or non-metal elements.

In addition, the cathode active material may be a solid solution of LiMO2 and Li2MO3, for example, a solid solution represented by 0.5LiNiMnCoO2-0.5Li2MnO3.

Furthermore, one having a coating layer on the surface of the positive active material may be used, or a mixture of the compound and a compound having a coating layer may be used. The coating layer may include at least one coating element compound selected from the group consisting of oxides, hydroxides, oxyhydroxides, oxycarbonates, and hydroxycarbonates of coating elements.

Compounds constituting these coating layers may be amorphous or crystalline. As the coating element included in the coating layer, Mg, Al, Co, K, Na, Ca, Si, Ti, V, Sn, Ge, Ga, B, As, Zr, or mixtures thereof may be used.

In the positive electrode, the positive active electrode material may be 90 to 98% by weight based on the total amount of the dry positive electrode composition.

The dry electrode composition includes a binder. Examples of the binder include polytetrafluoroethylene, polyethylene oxide, polyvinylpyrrolidone, polyvinyl alcohol and cellulose derivatives. The binder as described above is particles in which fine fibers are agglomerated to form a bundle, and by applying predetermined heat and pressure, the fibers constituting the bundle are released, respectively, and may be formed into fine fibers.

The binder may be included in an amount of 1 to 5% by weight based on the dry electrode composition. For example, the binder may be included in an amount of 1 wt % or more, 1.5 wt % or more, or 2 wt % or more, and may be included in an amount of 5 wt % or less, 4.5 wt % or less, or 4 wt % or less. If the content of the binder is less than 1% by weight, there is a problem of insufficient binding force between active materials, and if it exceeds 5% by weight, there is a problem of excessive increase in electrode resistance.

In addition to the fiber bundle binder, a particulate binder may be further included. As the particulate binder, those commonly used in electrode manufacturing may be used, but are not particularly limited. For example, the particulate binder may be at least one selected from the group consisting of polyvinylidene fluoride, polyvinylidene fluoride-hexafluoropropylene, polyvinylidene fluoride-trichloroethylene, polymethylmethacrylate, polyacrylonitrile, polyvinylpyrrolidone, polyvinyl Acetate, Ethylene-Vinyl Acetate Copolymer, Polyethylene Oxide, Cellulose Acetate, Cellulose Acetate Butyrate, Cellulose Acetate Propionate, Cyanoethyl Pullulan, Cyanoethyl Polyvinyl Alcohol, Cyanoethyl Cellulose, Cyanoethyl Sucrose and Pullulan.

Furthermore, the dry electrode composition may further include a thickener. As the thickener, those commonly used in electrode manufacturing may be used, but are not particularly limited, and the thickener may be at least one selected from the group consisting of, for example, Carboxymethyl Cellulose (CMC), Hydroxypropylmethyl Cellulose, Methylcellulose, Polyvinyl Alcohol (PVA) and Sodium Polyacrylate (Na-PA).

The conductive material may be used without limitation as long as it is commonly used in secondary batteries, and for example, carbon-based materials such as graphite such as natural graphite or artificial graphite, carbon black, acetylene black, ketjen black, carbon fiber, and carbon nanotubes. However, it may be at least one selected from the group consisting of metal-based materials such as metal powders or metal fibers such as copper, nickel, aluminum, and silver, and conductive polymers such as conductive oxides or polyphenylene derivatives. The conductive agent is not limited thereto, but may be included in an amount of, for example, 0.5 to 3% by weight based on the total electrode composition.

A dry electrode composition manufacturing method according to an embodiment may include mixing a dry electrode composition including an active electrode material and a binder, as described above. As a result, the active electrode material, the binder, and the conductive material added as needed may be evenly distributed.

Figure 1:
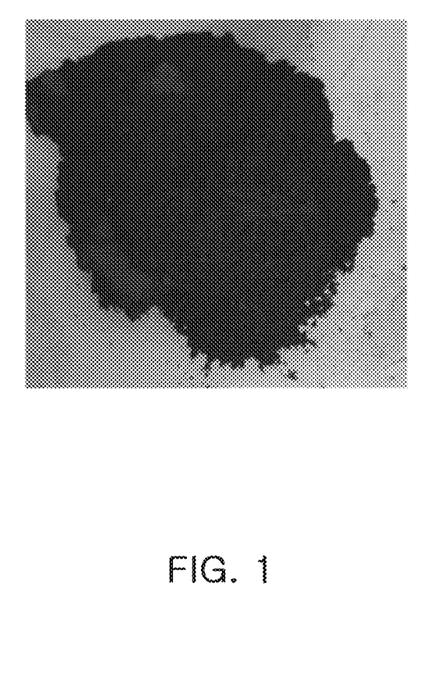
FIG. 1 is a photograph illustrating a dry electrode composition according to an embodiment.

The mixing is not particularly limited, and may be applied in this embodiment as long as it is mixing solid powder. For example, a blender, mixer, etc. may be used, and any powder included in the dry electrode composition may be mixed. The mixing conditions are not particularly limited. As an example of the dry electrode composition prepared by the above method, a photograph of a dry cathode composition in which a cathode active material, a binder, and a conductive material are mixed in a blender is illustrated in FIG. 1.

A dry electrode sheet may be manufactured using the dry electrode composition as described above. As described above, the method of manufacturing the dry electrode sheet includes a calendering operation, a cutting operation, and a laminating and calendering operation.

Figure 2:
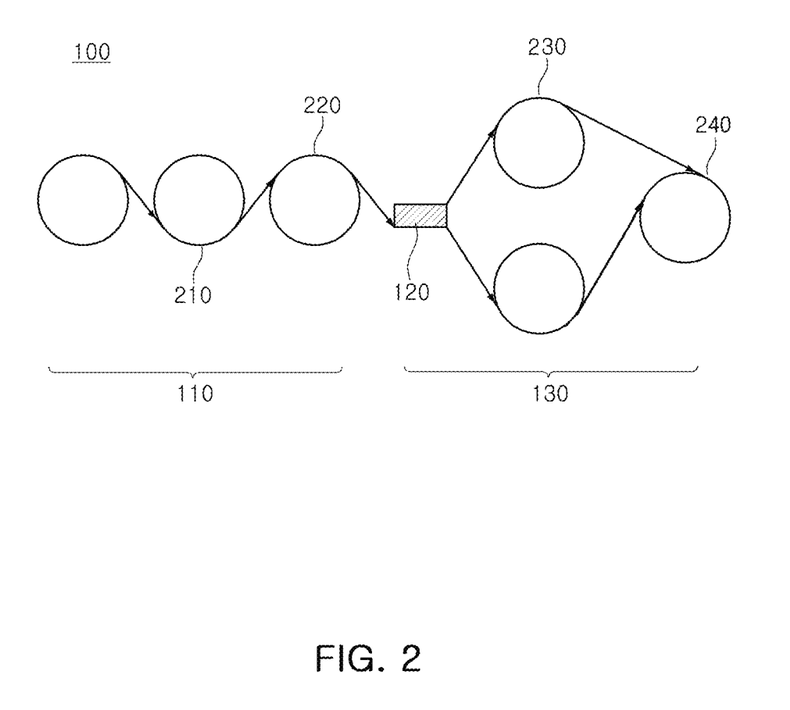
FIG. 2 is a diagram illustrating an apparatus for manufacturing a dry electrode sheet according to an embodiment.

A dry electrode sheet manufacturing method and manufacturing apparatus according to an embodiment are schematically illustrated in FIG. 2. As illustrated in FIG. 2, to manufacture a dry electrode sheet, the dry electrode manufacturing apparatus may include a calender roll 110 performing the calendering operation, a cutting part 120 for cutting the electrode sheet 220 manufactured by the calendering, and a lamination unit 130 for laminating the cut electrode sheets 230 and supplying the lamination electrode sheets 240 to the calender roll 110.

In an embodiment, the dry electrode sheet manufacturing method includes a calendering operation. The calendering operation is an operation of sheeting using the dry electrode composition containing the fibrous binder, and an electrode sheet may be prepared from the dry electrode composition.

The calendering operation may be performed by a calender roll 110 including two or more rolls rotating the dry electrode composition including the fibrous binder. In detail, the electrode composition may be prepared in a sheet form by injecting the dry electrode composition containing the fibrous binder between two rolls spaced apart at a predetermined interval and applying pressure between the rolls.

The calender roll 110 may include two or more rolls. In detail, it may be composed of two or three rolls, and may be composed of more rolls. Therefore, as an example, calendering may be performed by the first roll and the second roll, and then calendering may be performed by the second roll and the third roll. As illustrated in FIG. 2, a dry electrode composition is introduced between the first roll and the second roll to prepare a sheet-shaped electrode sheet precursor 210, and subsequently, the first electrode sheet 220 may be manufactured by injecting the obtained electrode sheet precursor 210 between the second roll and the third roll.

Furthermore, although not illustrated in the drawings, calendering may be performed by a pair of rolls composed of two rolls and another pair of rolls composed of the other two rolls. In detail, calendering may be performed by a pair of calender rolls 110 composed of a first roll and a second roll and another pair of calender rolls 110 composed of a third roll and a fourth roll. For example, a dry electrode composition is injected between a pair of calender rolls 110 composed of a first roll and a second roll to prepare a sheet-shaped electrode sheet precursor 210, and the prepared electrode sheet dry spheres 210 The first dry electrode sheet 220 may be manufactured by calendering by insertion between the other pair of calendering rolls composed of the third and fourth rolls.

A dry electrode sheet manufacturing method according to an embodiment is to prepare an electrode sheet using powder containing an active electrode material and a binder without using a solvent, and the binder included in the dry electrode composition is prepared by applying heat and pressure. It may be fibrous, and it is possible to bind between active electrode materials by the fibrous binder. In detail, a binder existing in a particulate form by forming a bundle is softened by heat and pressure provided in a calendering process, and the bundle is released to form a fibrous binder. The fibrous binder formed thereby is included in the dry electrode composition and attached to the surface of particles such as active electrode materials to bind active electrode materials together, thereby maintaining a sheet shape without a separate support such as a current collector.

The heat may be provided by heating each roll constituting the calender roll 110 to a predetermined temperature range. The heating temperature of the roll is not limited thereto, but may be 40° C. or higher. When the temperature of the roll is less than 40° C., the binder existing in the form of bundles may not be fibrous, and therefore, it does not provide sufficient binding force with powders such as active electrode materials, and sufficient tensile strength for the electrode sheet may not be able to provide Meanwhile, as long as the temperature of the calender roll 110 does not cause thermal decomposition of the fibrous binder, the upper limit of the temperature is not particularly limited. In detail, the roll may be heated to a temperature of 200° C. or less, and more in detail, it may be 200° C. or less in terms of preventing the binder from adhering to the surface of the roll.

The rolls may be spaced apart at predetermined intervals. The distance between the rolls is not limited thereto, but for example, may be 100 to 500 μm, specifically 100 μm or more, 150 μm or more, 200 μm or more, but is not limited thereto. It may be μm or more or 250 μm or more, and may be 500 μm or less, 450 μm or less, or 300 μm or less. If the distance between the rolls is less than 100 μm, electrode rolling may occur due to excessive pressure, and the density of the electrode may increase excessively, and if the distance exceeds 500 μm, the pressure provided to the electrode sheet may be insufficient, resulting in fiberization of the binder, and the binding effect may also deteriorate.

Next, a cutting operation of cutting the first dry electrode sheet 220 manufactured by the calendering operation is included. The cutting is an operation of dividing the first dry electrode sheet 220 into two or more pieces, and as illustrated in FIG. 3A, the first dry electrode sheet 220 may be cut in the longitudinal direction, and as illustrated in FIG. 3B, the first dry electrode sheet 220 may be cut in the width direction.

Figure 3A:
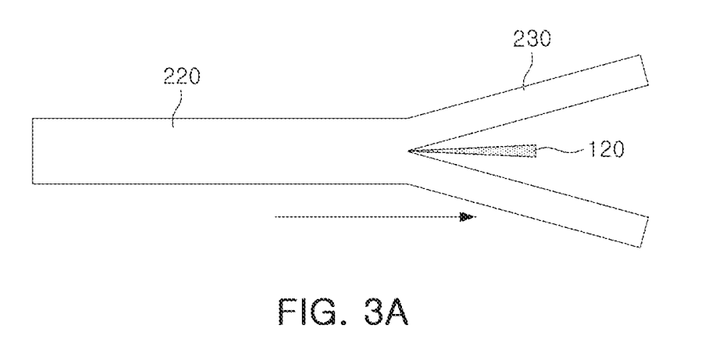
FIG. 3A is for a method of cutting the electrode sheet in the longitudinal direction.
Figure 3B:
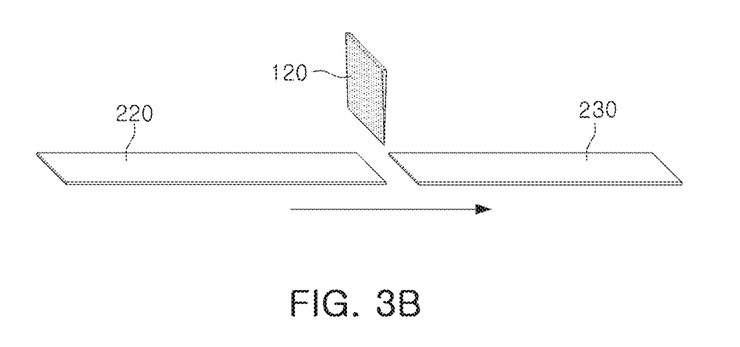
FIG. 3B is for a method of cutting the electrode sheet in the width direction.

In detail, as illustrated in (a) of FIG. 3, the cutter of the cutting part 120 is installed at a position passing through the center of the first dry electrode sheet 220 in the width direction of the first dry electrode sheet 220 manufactured in the calendering operation, and the first dry electrode When the sheet 220 passes through the cutter, the first dry electrode sheet 220 may be cut in the longitudinal direction. As illustrated in FIG. 3A, the first dry electrode sheet 220 may be cut in half in the longitudinal direction, but may be cut in two or more, for example, into three, four, or five. Furthermore, each of the cut electrode sheets 230 may have the same width or may have different widths.

In addition, as illustrated in (b) of FIG. 3, the cutter of the cutting part 120 is installed in the width direction of the first dry electrode sheet 220 manufactured in the calendering operation, and the first dry electrode sheet 220 After moving by a predetermined distance, the first dry electrode sheet 220 may be cut in the width direction using the cutter at the top or bottom. At this time, the cutting is not particularly limited to being performed at a desired interval with respect to the entire length of the first dry electrode sheet 220, and the lengths of the cut electrode sheets 230 may be the same or different from each other.

An operation of laminating and calendering the cut electrode sheet 230 is included. The laminating and calendering operations may be performed continuously or intermittently after performing the cutting operation.

For example, after cutting the first dry electrode sheet 220 in the longitudinal direction or the width direction, the continuously cut electrode sheets 230 are separated from each other and transported on one of the cut electrode sheets 230. A lamination operation may be performed by stacking another cut electrode sheet 230. For example, as illustrated in FIG. 2, each of the cut electrode sheets 230 is transported by different transfer rolls, and two or more cut electrode sheets may be laminated on a laminating roll to obtain a laminated electrode sheet 240.

At this time, in the case in which the first dry electrode sheet 220 is cut in the width direction, the transport path of one cut electrode sheet 230 cut first is adjusted to be long, and another cut electrode sheet 230 cut next and reach the laminating roll at the same time, whereby the laminated electrode sheet 240 may be obtained.

On the other hand, in the case of intermittently performing the cutting operation and the lamination operation, after cutting the first dry electrode sheet 220 in the length direction or width direction, each cut electrode sheet 230 is wound up and stored or moved. Afterwards, the laminated electrode sheet 240 may be obtained by providing the laminated material. To this end, a separate rewinding roll may be included according to the number of the cut electrode sheets 230.

Meanwhile, the laminated electrode sheet 240 may be calendered after lamination or after winding the laminated electrode sheet 240. In an embodiment, by performing the calendering operation after the cutting operation and the laminating operation, a kneading effect may be provided to the electrode sheet, thereby further improving the tensile strength of the final electrode sheet.

That is, in the process of calendering the dry electrode composition, by providing heat and pressure to the binder, the particulate binder in which fine fibers are agglomerated and forming a bundle is fibrous, and a predetermined tensile strength may be provided to the electrode sheet by the fibrous binder. This may result in insufficient fiberization of the binder. In detail, when calendering, only narrowing the gap between the rolls cannot provide sufficient tensile strength, and kneading the dry electrode composition cannot provide directionality, so there is a limit to improving tensile strength.

Therefore, in an embodiment, after cutting and laminating the first dry electrode sheet 220 manufactured by the calendering, calendering of the laminated electrode sheet 240 is repeated to provide a kneading effect. Therefore, the tensile strength of the final electrode sheet may be further improved.

The calendering may be performed using a separate calender roll, or calendering may be performed using the calender roll 110 for manufacturing the first dry electrode sheet by calendering the dry electrode composition. Using the calender roll 110 used in the calendering operation may reduce equipment cost. Therefore, a detailed description of the calender roll 110 will be omitted.

Since the laminated electrode sheet 240 is thicker than the first dry electrode sheet 220 manufactured by the calender roll 110, pressure may be applied to the laminated electrode sheet 240, resulting in providing a kneading effect.

Calendering operation by continuously supplying the laminated electrode sheet 240 obtained in the calendering operation to the calender roll 110 or supplying the laminated electrode sheet 240 to the calender roll 110 after winding the laminated electrode sheet 240 may be performed.

The operation of calendering the laminated electrode sheet 240 may be performed twice or more. In detail, after manufacturing an electrode sheet by calendering the laminated electrode sheet 240, using the electrode sheet as a first dry electrode sheet 210, cutting it at the cutting part 120 and laminating it at the laminating part 130. Later, it may be transferred to the calender roll 110 again to perform calendering.

The number of times of calendering the laminated electrode sheet 240 is not particularly limited, and may be performed until an electrode sheet having a desired tensile strength is obtained, for example, 20 times or less. In detail, it may be performed 2 or more times, 3 or more times, 5 or more times, 7 or more times, or 9 or more times, and may be performed 20 times or less, 18 times or less, 16 times or less, or 15 times or less.

According to another aspect of the present disclosure, an electrode sheet having improved tensile strength is provided by manufacturing an electrode sheet by the calendering operation of the dry electrode composition, the cutting operation, the laminating operation, and the calendering operation of the laminated electrode sheet.

In an embodiment, the electrode sheet may include an active electrode material and a fibrous binder, and may have a tensile strength of 0.50 N/mm 2 or more. For example, the electrode sheet may have a tensile strength of 0.7 N/mm$^2$ or more, 0.8 N/mm$^2$ or more, or 0.9 N/mm2 or more. If the tensile strength of the electrode sheet is less than 0.50 N/mm$^2$, it may be difficult for the electrode sheet to maintain the sheet shape thereof, such as cracks or breakage in the electrode sheet.

The electrode sheet manufactured according to this embodiment is not particularly limited, but may have an electrode density of 2.0 g/cc or more. For example, the electrode density of the electrode sheet may be 2.1 g/cc or more, 2.2 g/cc or more, 2.3 g/cc or more, 2.4 g/cc or more, 2.5 g/cc or more, or 2.6 g/cc or more.

Although not particularly limited, the electrode sheet may have a thickness of 100 to 500 μm. When the thickness of the electrode sheet is less than 100 μm, the tensile strength of the electrode sheet is insufficient and breakage may occur, and when the thickness exceeds 500 μm, the electrode sheet may be mixed non-uniformly in the thickness direction of the composition components constituting the electrode. For example, the electrode sheet may be 150 μm or more, 200 μm or more, or 250 μm or more, and may be 450 μm or less or 400 μm or less.

In addition, another aspect of the present disclosure is provided with an electrode including the above-described electrode sheet. In detail, the electrode may be manufactured by placing the electrode sheet on at least one surface of an electrode current collector, heating and pressurizing the electrode sheet.

The electrode current collector is not particularly limited as long as it has high conductivity without causing chemical change in the battery. When the electrode is an anode, the current collector for the electrode is not particularly limited, but a thin plate made of aluminum, stainless steel, or nickel may be used, and more in detail, a thin plate made of aluminum may be used. In addition, when the electrode is a negative electrode, for example, copper, stainless steel, nickel, titanium, calcined carbon, copper, or stainless steel surface treated with carbon, nickel, titanium, silver, or an aluminum-cadmium alloy, etc. may be used.

The electrode current collector may be in various forms such as a film, sheet, foil, porous material, foam, nonwoven fabric, mesh or mesh shape. In addition, fine irregularities may be formed on the surface to enhance bonding strength with the electrode sheet, and the surface may be coated with an oxidation-resistant metal or alloy film to prevent oxidation.

Furthermore, a secondary battery may be manufactured by using the electrode as an anode, a cathode, or a cathode and a cathode. For example, a secondary battery may be manufactured by manufacturing an electrode assembly by sequentially stacking a positive electrode and a negative electrode with a separator as a boundary, accommodating the electrode assembly together with an electrolyte in a battery case and sealing it. At this time, the battery case is not particularly limited, but may be a pouch-type case, and may be a prismatic or cylindrical metal case.

Furthermore, a secondary battery module may be constructed using the secondary battery according to the present disclosure, and one or more of the modules may be packaged in a pack case to form a secondary battery pack.

The above-described secondary battery module and secondary battery pack including the same may be applied to various devices. In detail, it may be applied to various devices that may use a secondary battery module and a secondary battery pack including the same, and is not particularly limited, but may be applied to transportation means such as, for example, electric bicycles, electric vehicles, and hybrid vehicles.

EXAMPLE

Hereinafter, the present disclosure will be described in more detail through specific examples. The following examples are merely examples to aid understanding of the present disclosure, and the scope of the present disclosure is not limited thereto.

Example 1

96.5% by weight of cathode active material containing nickel, cobalt, and manganese in a weight ratio of 8:1:1, 0.5% by weight of carbon nanotube conductive material, and 3% by weight of polytetrafluoroethylene (PTFE) binder were kneaded in a powder mixer A dry electrode composition was prepared.

As illustrated in FIG. 2, the dry cathode composition is introduced between the first roll and the second roll of the calender roll where three rolls of the first roll, the second roll, and the third roll are continuously positioned to form a positive electrode sheet. After preparing the precursor, the positive electrode sheet precursor was continuously introduced between the second roll and the third roll to prepare a first positive electrode sheet.

At this time, the temperature of each roll was 60° C., and the interval between each roll was 100 µm.

Subsequently, as illustrated in (a) of FIG. 3, the prepared first cathode sheet was cut in the longitudinal direction by the cutting unit to manufacture two identically cut electrode sheets.

The cut electrode sheet is transferred and supplied to a laminating roll, and after laminating the two cut electrode sheets on the laminating roll, it is transferred to the calender roll to be transferred between the first and second rolls and between the second and third rolls. A second electrode sheet was prepared by continuously adding and calendering the laminated electrode sheet.

A twelfth electrode sheet was manufactured by repeating the cutting, laminating, and calendering processes on the prepared second electrode sheet to perform a total of 12 calendering processes.

Figure 4:
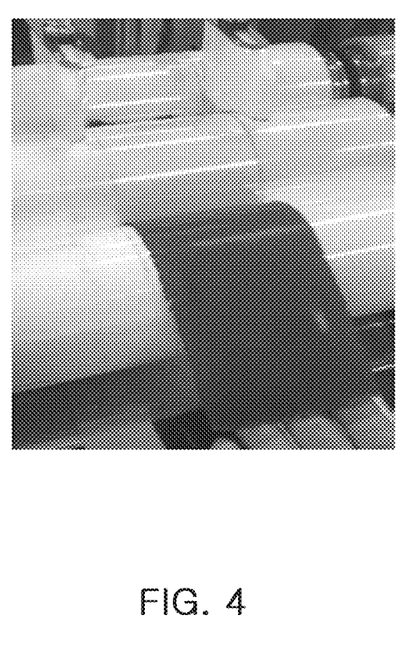
FIG. 4 is a photograph of a dry electrode sheet for a secondary battery manufactured in Example 1 of the present disclosure.
Figure 5:
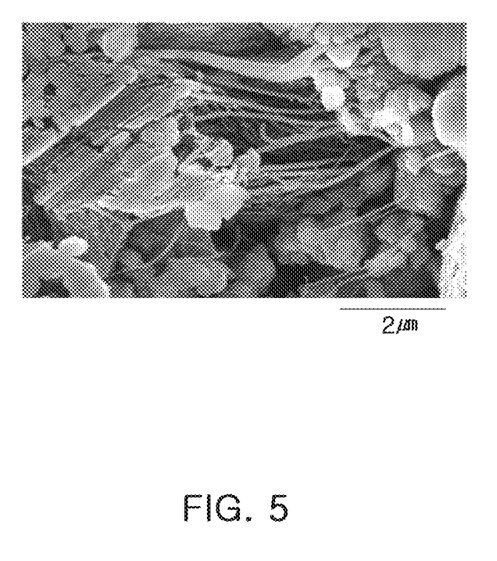
FIG. 5 is a photograph taken with an electron microscope of the cathode sheet prepared in Example 1.

The prepared twelfth electrode sheet was obtained as a final electrode sheet, and a photograph of the obtained electrode sheet is illustrated in FIG. 4. Meanwhile, the obtained cathode sheet was observed with an electron microscope, and a photograph thereof is illustrated in FIG. 5 (10.0 kV, magnification 15,000×). As may be seen from FIG. 5, it was found that the prepared positive electrode sheet had a fibrous binder distributed on the surface of the positive active electrode material.

Furthermore, the density and tensile strength of the obtained electrode sheet were measured by the following method, and the results are illustrated in Table 1.

Density: After cutting the electrode coating to a certain size, the weight (electrode loading) and thickness of both sides of the electrode were measured. The density of the electrode sheet was obtained using Equation 1 below.

$$\text{Density of electrode sheet} \left[\frac{g}{cc}\right] = \frac{2 \times \text{Electrode loading} \left[\text{mg/cm}^2\right]}{\text{Electrode thickness } [\mu m] - \text{Foil thickness } [\mu m]} \times 100 \qquad \text{Equation (1)}$$

Tensile strength: An electrode sheet with a width of 10 mm×length of 100 mm was manufactured and measured by pulling both ends of the specimen at a speed of 5 cm/min with UTM (Universal Testing Machine) equipment.

Comparative Example 1

The first electrode sheet obtained in Example 1 was put into a calender roll without a cutting operation and a laminating operation, and the calendering process was performed a total of 12 times to manufacture a twelfth electrode sheet, except that the final electrode sheet was made. An electrode sheet was prepared in the same manner as in 1.

The thickness, density and tensile strength of the prepared cathode sheet were measured, and the results are illustrated in Table 1.

TABLE 1

|  | Electrode sheet density [g/cc] | Electrode sheet tensile strength [N/mm²] |
|---|---|---|
| Example 1 | 2.5 | 0.9 |
| Comparative Example 1 | 2.5 | 0.2 |

As may be seen from Table 1, the electrode sheet of Example 1 manufactured by cutting and laminating the first electrode sheet manufactured by the calendering process and performing the calendering process on the laminated electrode sheet a plurality of times is It was found that the strength was 0.9 N/mm², which was significantly higher than the tensile strength of 0.2 N/mm² of the electrode sheet of Comparative Example 1 in which no cutting and lamination processes were performed.

Therefore, the tensile strength of the electrode sheet cannot be improved simply by performing only the calendering process multiple times. As provided in the present disclosure, when an electrode sheet manufactured by calendering is cut, the cut electrode sheet is laminated, and then a process of calendering the laminated electrode sheet again is performed a plurality of times, a kneading effect for the electrode sheet may be obtained. As a result, fiberization of the binder included in the dry electrode composition may be further promoted, and therefore, it may be evaluated that the tensile strength could be improved.

As set forth above, according to a method of manufacturing a dry electrode sheet for a secondary battery according to an embodiment, the quality of an electrode may be improved by not including a drying process of a solvent.

In addition, according to an embodiment, since a drying process of a solvent is not included, strict control of the drying process for uniform drying is not required, and thus the efficiency of the electrode manufacturing process may be improved.

In addition, according to a method of manufacturing a dry electrode sheet for a secondary battery according to an embodiment, an effect of kneading a calendering process for manufacturing an electrode sheet, and therefore, the tension and tensile strength of the electrode sheet manufactured may be further improved.

While example embodiments have been illustrated and described above, it will be apparent to those skilled in the art that modifications and variations could be made without departing from the scope of the present disclosure as defined by the appended claims.

100: apparatus for manufacturing a dry electrode sheet
110: calender roll
120: cutting part
130: laminating part
210: electrode sheet precursor
220: first dry electrode sheet or dry electrode sheet
230: cut electrode sheet
240: laminated electrode sheet

What is claimed is:

1. An apparatus for manufacturing a dry electrode sheet for a secondary battery, comprising:
    a calender roll including two or more rolls spaced apart from each other and manufacturing an electrode sheet by calendering a dry electrode composition supplied between the two or more rolls;
    a cutting unit cutting the electrode sheet manufactured by the calender roll into two or more pieces; and
    a lamination unit laminating electrode sheets cut by the cutting unit and supplying laminated electrode sheets to the calender roll.

2. The apparatus of claim 1, wherein in the calender roll, at least three rolls of a first roll, a second roll, and a third roll are sequentially disposed, and the first roll and the second roll, and the second roll and the third roll are spaced apart.

3. The apparatus of claim 1, wherein the two or more rolls are spaced apart at intervals of 100 to 500 μm.

4. The apparatus of claim 1, further comprising two or more first rewinding rolls respectively winding the electrode sheet cut by the cutting unit,
    wherein the cut electrode sheet wound around the first rewinding roll is supplied to the lamination unit.

5. The apparatus of claim 1, wherein the cutting unit cuts the electrode sheet in a longitudinal direction or a width direction.

6. The apparatus of claim 1, further comprising a second rewinding roll that winds an electrode sheet laminated by the lamination unit,
    wherein the laminated electrode sheet wound around the second rewinding roll is supplied to the calender roll.

* * * * *